(12) United States Patent
Yun

(10) Patent No.: US 12,139,947 B2
(45) Date of Patent: Nov. 12, 2024

(54) DOOR CONNECTION STRUCTURE

(71) Applicants: HYUNDAI MOTOR COMPANY, Seoul (KR); Kia Corporation, Seoul (KR)

(72) Inventor: Hyungin Yun, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 294 days.

(21) Appl. No.: 17/870,229

(22) Filed: Jul. 21, 2022

(65) Prior Publication Data
US 2023/0151662 A1 May 18, 2023

(30) Foreign Application Priority Data
Nov. 17, 2021 (KR) .......................... 10-2021-0158632

(51) Int. Cl.
| | |
|---|---|
| E05D 15/58 | (2006.01) |
| B60J 5/04 | (2006.01) |
| E05D 3/02 | (2006.01) |
| E05D 3/12 | (2006.01) |
| E05D 11/06 | (2006.01) |

(52) U.S. Cl.
CPC .............. *E05D 15/58* (2013.01); *B60J 5/047* (2013.01); *B60J 5/0479* (2013.01); *E05D 3/022* (2013.01); *E05D 3/127* (2013.01); *E05D 11/06* (2013.01); *B60J 2005/0475* (2013.01); *E05Y 2800/102* (2013.01); *E05Y 2900/531* (2013.01)

(58) Field of Classification Search
CPC .. B60J 2005/0475; B60J 5/047; B60J 5/0479; B60J 5/0477; E05D 3/127; E05D 15/58; E05D 3/022; E05D 2015/586
See application file for complete search history.

(56) References Cited

U.S. PATENT DOCUMENTS

| | | | |
|---|---|---|---|
| 2005/0127712 A1* | 6/2005 | Castillo | ................... E05D 3/127 296/146.12 |
| 2006/0175867 A1* | 8/2006 | Heuel | ..................... E05D 15/58 296/155 |
| 2019/0077233 A1* | 3/2019 | Ma | ......................... E05D 15/28 |

* cited by examiner

*Primary Examiner* — Daniel J Colilla
(74) *Attorney, Agent, or Firm* — MORGAN, LEWIS & BOCKIUS LLP

(57) ABSTRACT

A door connection structure includes a door guide for guiding a door in the longitudinal direction of a vehicle body, a door hinge arm mounted on the vehicle body, and including a hinge rotation shaft and a door rotation shaft, the door hinge arm rotating around the hinge rotation shaft when the door is sliding, a door hinge rotatably mounted around the door rotation shaft and connected to the door, a first catcher rotatably mounted on the door hinge arm and of which a center striker guide is formed thereto, and a center striker which is inserted into the center striker guide to rotate the first catcher and limits rotation of the first catcher when the door swings so that the door swings around the door rotation shaft.

18 Claims, 15 Drawing Sheets

DOOR CONNECTION STRUCTURE

CROSS-REFERENCE TO RELATED APPLICATION

The present application claims priority to Korean Patent Application No. 10-2021-0158632 filed on Nov. 17, 2021, the entire contents of which is incorporated herein for all purposes by this reference.

BACKGROUND OF THE PRESENT DISCLOSURE

Field of the Present Disclosure

The present disclosure relates to a door connection structure. More particularly, the present disclosure relates to a door connection structure in which a door is opened or closed by a double motion of sliding and swing motion.

Description of Related Art

The vehicle door includes a general door hinged to the vehicle body or pillar, a scissor door (or lambo door) that opens or closes by rotating the door upward, a butterfly door or gull wing door that opens or closes the door upper and outside, a sliding door that opens or closes the door in the longitudinal direction of the vehicle body, a coach door (or suicide door) in which the opening and closing directions of the front and rear doors are opposite and various forms of door are used.

In the case of an opposing door, if there is a pillar, the opening and closing of the front and rear doors is possible independently regardless of the opening and closing of other doors.

However, in the case of pillarless doors, the order of operation of the front and rear doors is fixed, or a structure that reinforces the door and vehicle body is required.

That is, in the case of pillarless doors, there is a problem that individual operation of front and rear doors is impossible when a general hinge structure is applied.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a door connection structure in which a door is opened or closed by a dual motion of sliding and swing motion.

Various aspects of the present disclosure are directed to providing a door connection structure applicable to a vehicle body without a pillar, regardless of the order of opening and closing.

Various aspects of the present disclosure are directed to providing a door connection structure which may be opened or closed in a double motion without an electrical operation configuration.

A door connection structure according to various exemplary embodiments of the present disclosure may include a door guide for guiding a door in the longitudinal direction of a vehicle body, a door hinge arm mounted on the vehicle body, and including a hinge rotation shaft and a door rotation shaft, the door hinge arm rotating around the hinge rotation shaft when the door is sliding, a door hinge rotatably mounted around the door rotation shaft and connected to the door, a first catcher rotatably mounted on the door hinge arm and of which a center striker guide is formed thereto, and a center striker which is inserted into the center striker guide to rotate the first catcher and limits rotation of the first catcher when the door swings so that the door swings around the door rotation shaft.

The door connection structure according to various exemplary embodiments of the present disclosure may further include a first catcher spring for elasticity supporting the first catcher in a direction opposite to a swing direction of the door when the door is opened.

The door connection structure according to various exemplary embodiments of the present disclosure may further include a second catcher rotatably mounted on the door hinge arm to maintain a fixed state of the first catcher when the door swings.

The door connection structure according to various exemplary embodiments of the present disclosure may further include a second catcher spring that elastically supports the second catcher in the swing direction when the door is opened.

The door connection structure according to various exemplary embodiments of the present disclosure may further include a door bracket mounted on the door for the first catcher to be rotatable by selectively pressing the second catcher when sliding motion and swing motion of the door are switched.

The door connection structure according to various exemplary embodiments of the present disclosure may further include a stopper mounted on the door hinge arm to limit rotation of the first catcher.

The first catcher may include a catching protrusion that contacts with the second catcher and its rotation is constrained when the door is closed, a guide surface contacting with the second catcher when the door is closed, and a fixing surface contacting with the second catcher when the door swings.

The guide surface may be a curved surface protruded outwardly, and the fixing surface may be a curved surface formed concave inwardly.

The second catcher may include a sliding side in selective contact with the guide surface, and a support surface in selective contact with the catching protrusion or the fixing surface.

The support surface may be a curved surface protruded outwardly corresponding to a shape of the fixing surface.

The door connection structure according to various exemplary embodiments of the present disclosure may further include a door hinge arm bracket mounted on the door hinge arm, wherein the first catcher and the second catcher are rotatably mounted on the door hinge arm bracket.

The door hinge arm bracket may include an internal flange to which the first catcher and the second catcher are mounted, and an external flange engaging the door hinge arm.

The center striker may be fixed to the hinge rotation shaft.

The center striker guide of the first catcher may include a first leg contacting with the center striker, and a second leg formed shorter than the first leg to selectively contact with the center striker.

The door guide may include a guide striker mounted on the vehicle body, and a guide body mounted on the door, wherein a strike guide portion into which the guide striker is inserted is formed in the guide body.

The door connection structure according to various exemplary embodiments of the present disclosure may further include a mounting bracket coupled to the vehicle body, and the hinge rotation shaft may be mounted to the mounting bracket.

The door may be an opposing door or an opposing swing door.

The door may be a rear door.

According to the door connection structure according to various exemplary embodiments of the present disclosure, the door may be opened or closed by a double motion of sliding and swing motion.

According to the door connection structure according to various exemplary embodiments of the present disclosure, it may be applied to the vehicle body without a pillar regardless of the opening and closing order.

According to the door connection structure according to various exemplary embodiments of the present disclosure, it is possible to open or close in a double motion without an electrical operation configuration.

Furthermore, the effects which may be obtained or predicted by various exemplary embodiments of the present disclosure will be disclosed directly or implicitly in the detailed description of various exemplary embodiments of the present disclosure. That is, various effects predicted according to various exemplary embodiments of the present disclosure will be disclosed within a detailed description to be described later.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
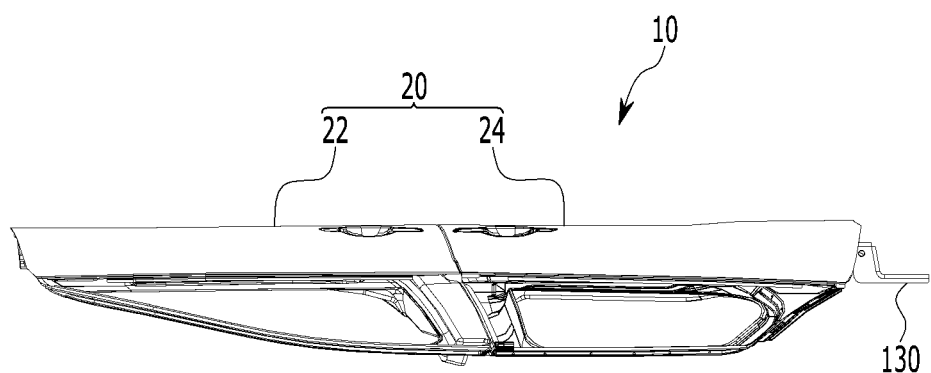
FIG. 1, FIG. 2, FIG. 3 and FIG. 4 is a top plan view showing the operation of the vehicle body to which the door connection structure according to various exemplary embodiments of the present disclosure may be applied.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown.

As those skilled in the art would realize, the described embodiments may be modified in various different ways, all without departing from the spirit or scope of the present disclosure.

To clearly explain an exemplary embodiment of the present disclosure, parts irrelevant to the description are omitted, and the same reference numerals are assigned to the same or similar elements throughout the specification.

Because the size and thickness of each component shown in the drawings are arbitrarily indicated for convenience of description, the present disclosure is not necessarily limited to those shown in the drawings, and the thicknesses are enlarged to clearly express various portions and regions.

Furthermore, in the detailed description below, the reason that the names of the components are divided into first, second, etc. is to classify the components in the same relationship, and it is not necessarily limited to the order in the following description.

Throughout the specification, when it is said that a certain part includes certain constituent elements, this means that other constituent elements may be further included, rather than excluding other constituent elements, unless specifically stated otherwise.

Furthermore, terms such as . . . part, . . . means described in the specification mean a unit of a comprehensive configuration that performs at least one function or operation.

When a part, such as a layer, film, region, plate, etc., is "on" another part, this includes not only the case where it is directly above the other part, but also the case where there is another part in between.

In contrast, when an element is referred to as being "directly on" another element, there are no intervening elements present.

Various exemplary embodiments of the present disclosure will hereinafter be described in detail with reference to the accompanying drawings.

FIG. 1, FIG. 2, FIG. 3 and FIG. 4 is a top plan view showing the operation of the vehicle body to which the door connection structure according to various exemplary embodiments of the present disclosure may be applied.

In FIG. 1, FIG. 2, FIG. 3 and FIG. 4, for convenience of understanding, although the door connection structure according to various exemplary embodiments of the present disclosure has shown an example applied to the pillar-less vehicle body to which the coach door (or suicide door) is applied, but is not limited thereto, the door connection structure according to various exemplary embodiments of the present disclosure may be also applied to the vehicle body with a pillar.

Furthermore, the door connection structure according to various exemplary embodiments of the present disclosure may be applied to a vehicle body to which an opposing door or an opposing swing door is applied.

In FIG. 1, FIG. 2, FIG. 3 and FIG. 4, a vehicle body 10 to which the door connection structure according to various exemplary embodiments of the present disclosure may be applied includes a door 20.

The door 20 may include a front door 22 in front of the vehicle and a rear door 24 in the rear of the vehicle.

For convenience of understanding, an exemplary embodiment of the door connection structure according to an exemplary embodiment of the present disclosure is referred to as an example applied to the rear door 24, but is not limited thereto, an exemplary embodiment of the door connection structure according to an exemplary embodiment of the present disclosure may also be applied to the front door.

Drawing reference number 130 refers to a mounting bracket for mounting the rear door 24 to the vehicle body 10, and specific operation will be described later.

Figure 2:
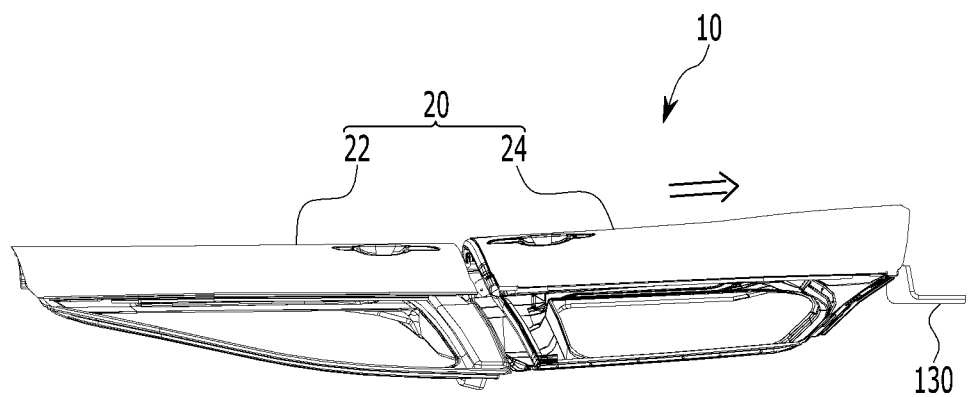
Figure 3:
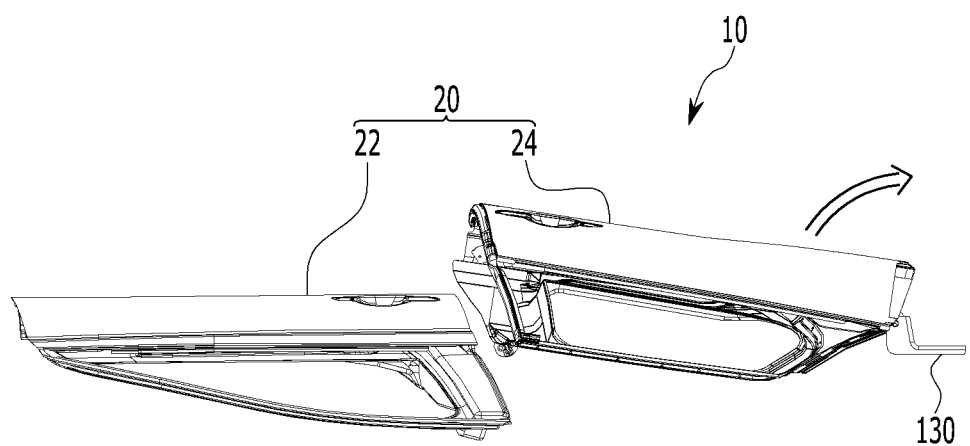
Figure 4:
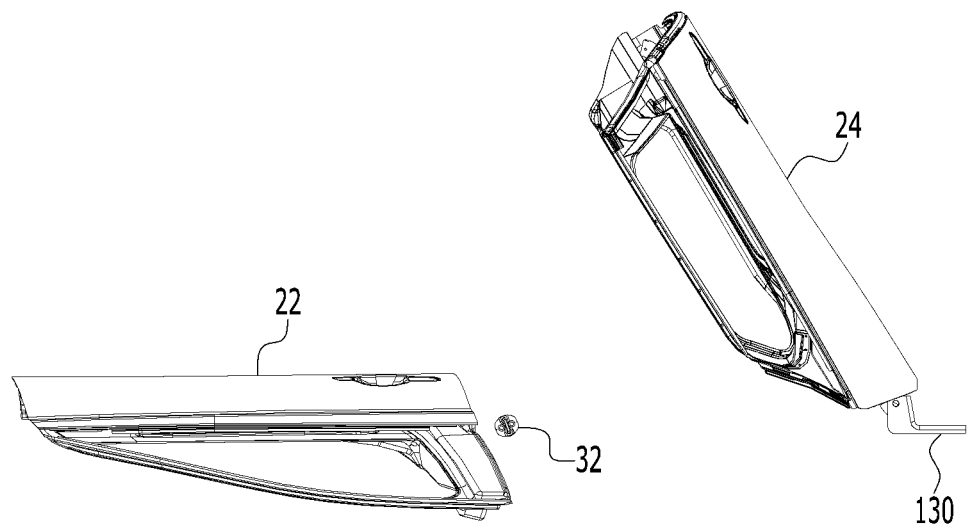

FIG. 1 shows the closed state of the rear door 24, FIG. 2 shows the sliding operation of the rear door 24, FIG. 3 shows the transition operation from the sliding operation of the rear door 24 to the swing operation, FIG. 4 shows the rear door 24 fully open state.

In the detailed description and claim of the present disclosure, the sliding operation refers to an operation in which the door 20 moves in the forward and backward direction of the vehicle body 10, and the swing operation refers to rotation of the door 20 around a rotation axis.

Figure 5:
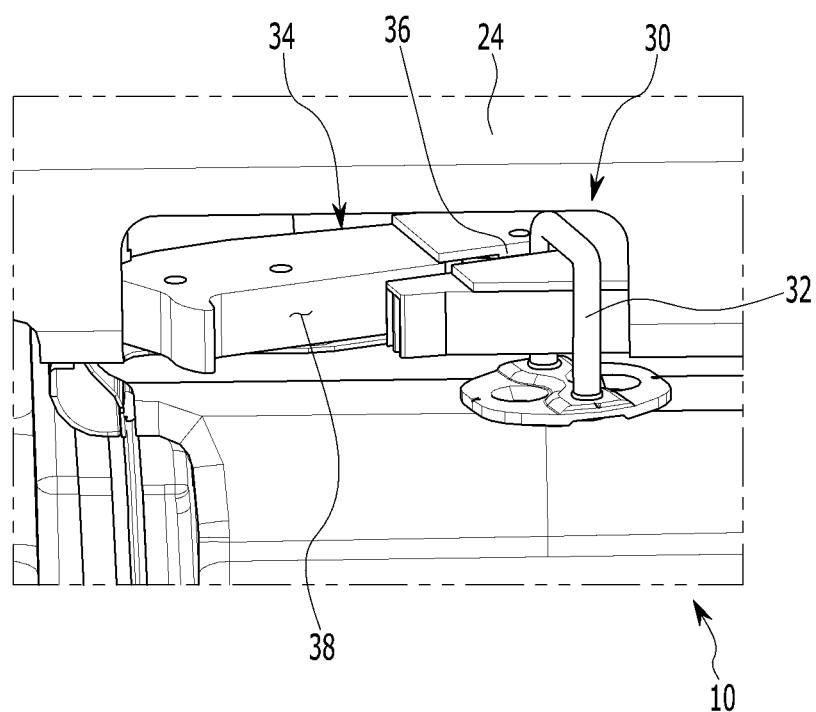
FIG. 5 and FIG. 6 is a perspective view of a door guide which may be applied to a door connection structure according to various exemplary embodiments of the present disclosure.
Figure 6:
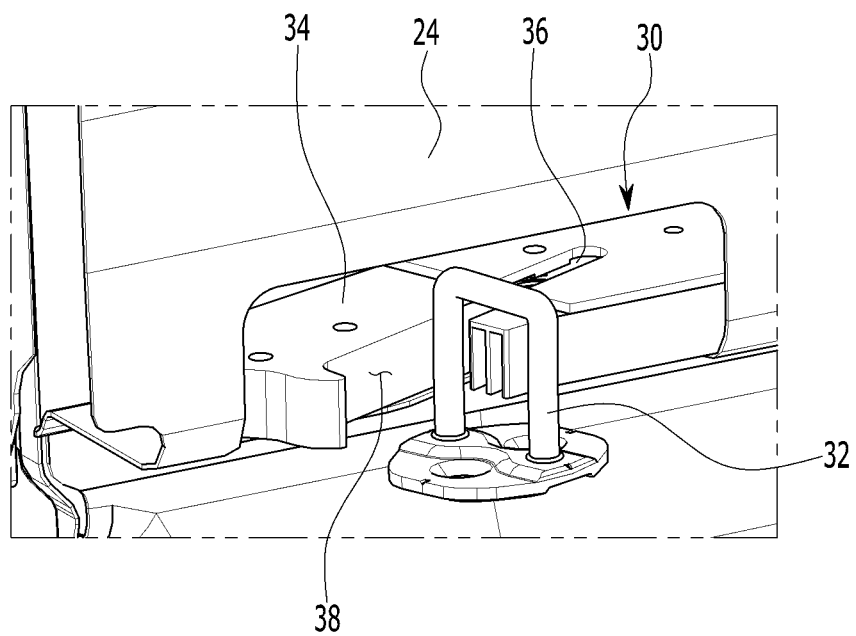

FIG. 5 and FIG. 6 is a perspective view of a door guide which may be applied to a door connection structure according to various exemplary embodiments of the present disclosure.

Referring to FIG. 1 to FIG. 6, the door connection structure according to various exemplary embodiments of the present disclosure may include a door guide 30 for guiding the door 20, for example, the rear door 24 in the longitudinal direction of the vehicle body 10.

The door guide 30 may include a guide striker 32 mounted on vehicle body 10, and a guide body 34 mounted on the door 20, for example the rear door 24, and of which a strike guide portion 36 into which the guide striker 32 is inserted is formed thereto.

Referring to FIG. 1 and FIG. 5, when the rear door 24 is closed, the guide striker 32 is inserted inside the strike guide portion 36.

Referring to FIG. 2 and FIG. 6, when the rear door 24 slides, that is, when the rear door 24 moves relative to the right side of drawing, the strike guide portion 36 moves relative to the guide striker 32, and guides the sliding operation of the rear door 24.

After that, when the rear door 24 performs a swing operation, the guide striker 32 is separated from the guide body 34 through the guide striker entrance 38 formed in the guide body 34, and then the rear door 24 can swing operation.

Figure 7:
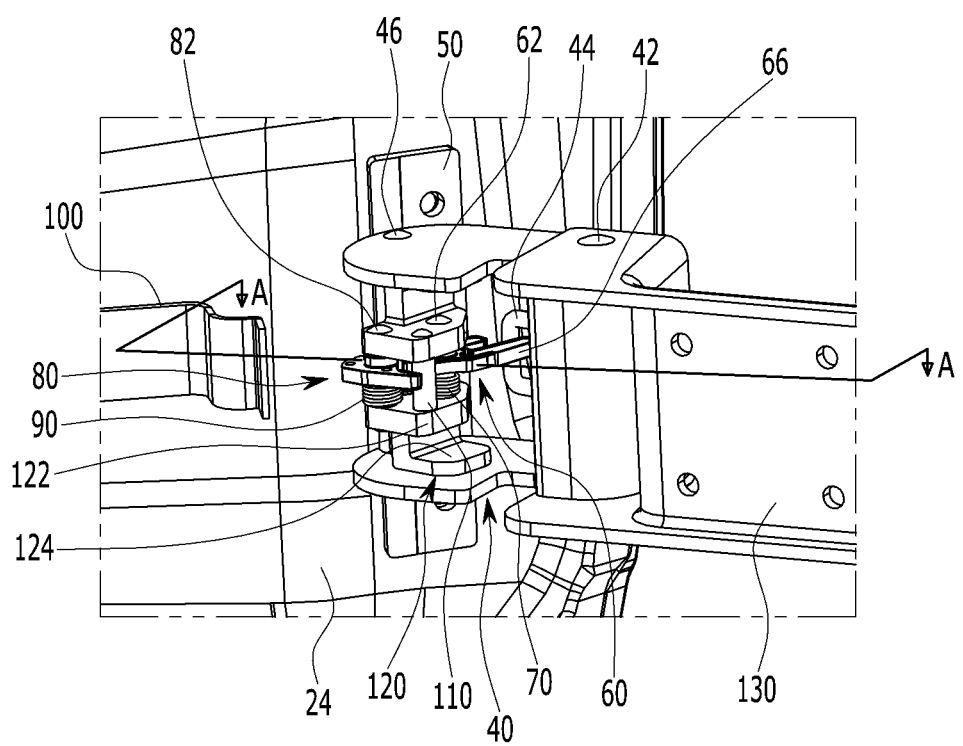
FIG. 7 is a partial perspective view of the door connection structure according to various exemplary embodiments of the present disclosure in which the door is closed.
Figure 8:
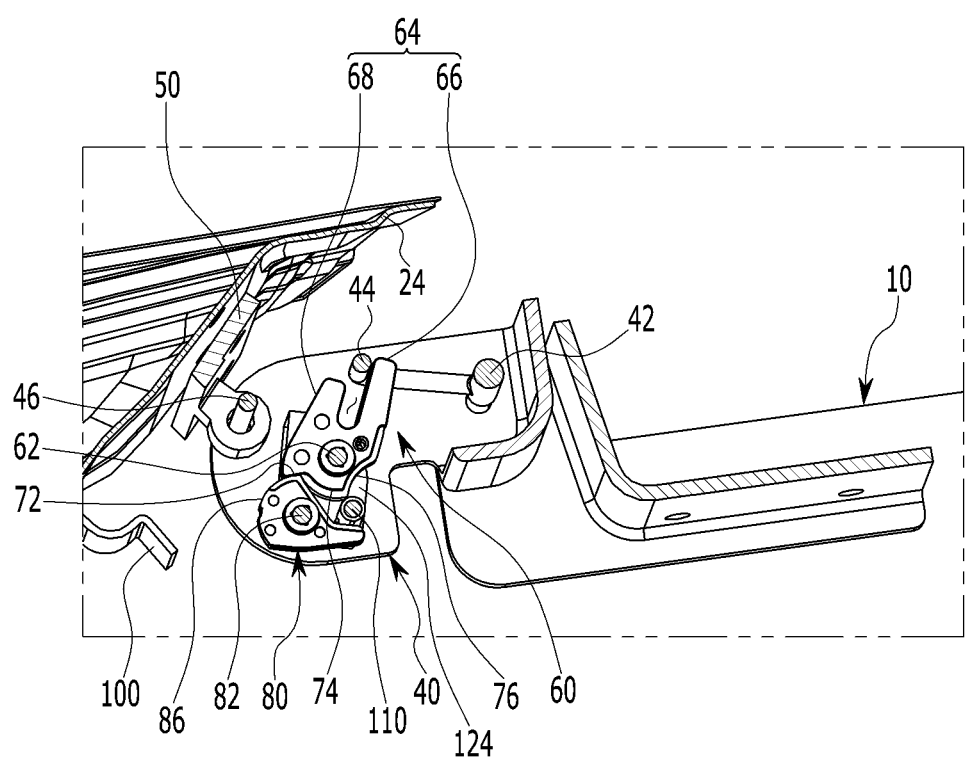
FIG. 8 is a cross-sectional view along the line A-A of FIG. 7.

FIG. 7 is a partial perspective view of the door connection structure according to various exemplary embodiments of the present disclosure in which the door is closed and FIG. 8 is a cross-sectional view along the line A-A of FIG. 7.

Figure 9:
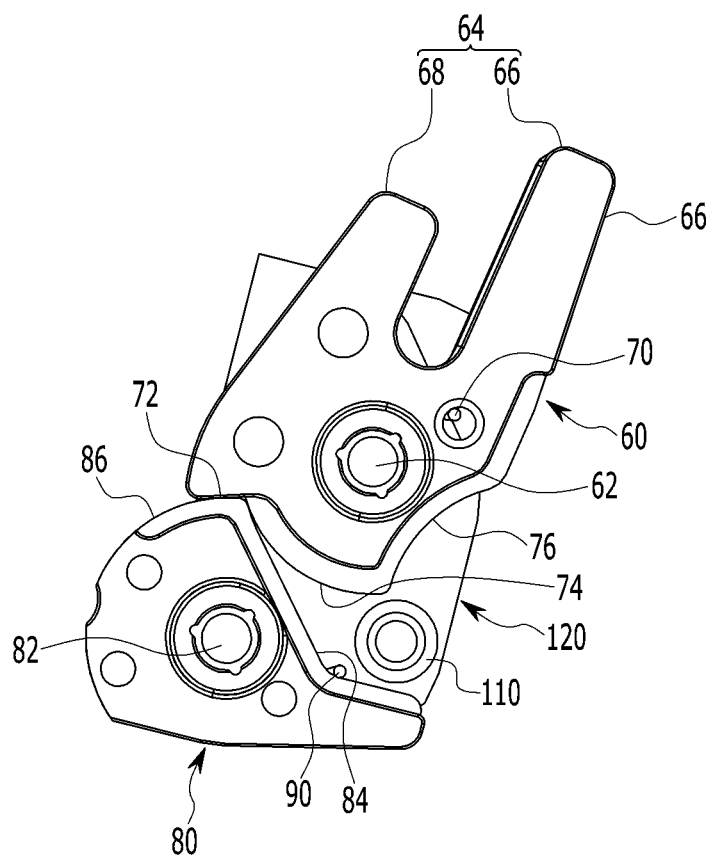
FIG. 9 is a top plan view of the first catcher and the second catcher which may be applied to the door connection structure according to various exemplary embodiments of the present disclosure.

FIG. 9 is a top plan view of the first catcher and the second catcher which may be applied to the door connection structure according to various exemplary embodiments of the present disclosure.

Referring to FIG. 1 to FIG. 9, the door connection structure according to various exemplary embodiments of the present disclosure may include a door hinge arm 40 mounted on the vehicle body 10 and including a hinge rotation shaft 42 and a door rotation shaft 46, a door hinge 50 rotatably mounted around the door rotation shaft 46 and connected to the door 20, a first catcher 60 rotatably mounted on the door hinge arm 40 and of which a center striker guide 64 is formed thereto, and a center striker 44.

The door hinge arm 40 may rotate around the hinge rotation shaft 42 when the door 20 is sliding.

When the door 20 is sliding, the center striker 44 is inserted into the center striker guide 64 to rotate the first catcher 60. The center striker 44 may limit the rotation of the first catcher 60 when the door 20 swings so that the door 20 swings around the door rotation shaft 46.

The center striker guide 64 of the first catcher 60 may include a first leg 66 contacting with the center striker 44 and a second leg 68 formed shorter than the first leg 66 to selectively contact with the center striker 44.

The second leg 68 is formed relatively short to prevent interference during rotation of the first catcher 60.

The door connection structure according to various exemplary embodiments of the present disclosure may further include a first catcher spring 70 for elasticity supporting the first catcher 60 in the opposite direction of the swing direction when the door 20 is opened.

The door connection structure according to various exemplary embodiments of the present disclosure may further include a second catcher 80 rotatably mounted on the door hinge arm 40 to maintain a fixed state of the first catcher 60 when the door 20 swings.

The door connection structure according to various exemplary embodiments of the present disclosure may further include a second catcher spring 90 that elastically supports the second catcher 80 in the swing direction when the door 20 is opened.

The swing direction when the door 20 is opened is clockwise based on the drawing.

The door connection structure according to various exemplary embodiments of the present disclosure may further include a door bracket 100 mounted on the door 20 for the first catcher 60 to be rotatable by selectively pressing the second catcher 80 when the sliding motion and swing motion of the door 20 are switched.

The door connection structure according to various exemplary embodiments of the present disclosure may further include a stopper 110 mounted on the door hinge arm 40 to limit the rotation of the first catcher 60.

The first catcher 60 may include a catching protrusion 72 that contacts with the second catcher 80 and its rotation is constrained when the door 20 is closed, a guide surface 74 contacting with the second catcher 80 when the door 20 is closed and a fixing surface 76 contacting with the second catcher 80 when the door 20 swings.

The guide surface 74 may be a curved surface protruded outwardly, and the fixing surface 76 may be a curved surface formed concave inwardly.

The second catcher 80 may include a sliding side 84 in selective contact with the guide surface 74, and a support surface 86 in selective contact with the catching protrusion 72 or the fixing surface 76.

The support surface 86 may be a curved surface protruded outwardly corresponding to the shape of the fixing surface 76.

The door connection structure according to various exemplary embodiments of the present disclosure may further include a door hinge arm bracket 120 mounted on the door hinge arm 40 and of which the first catcher 60 and the second catcher 80 are rotatably mounted thereon.

The door hinge arm bracket 120 may include an internal flange 122 to which the first catcher 60 and the second catcher 80 are mounted, and an external flange 124 engaging the door hinge arm 40.

The first catcher rotation shaft 62 is mounted on the internal flange 122, and the first catcher 60 is rotatably mounted on the first catcher rotation shaft 62.

The second catcher rotation shaft 82 is mounted on the internal flange 122, and the second catcher 80 is rotatably mounted on the second catcher rotation shaft 82.

The center striker 44 may be fixed to the hinge rotation shaft 42.

The door connection structure according to various exemplary embodiments of the present disclosure further includes the mounting bracket 130 coupled to the vehicle body 10, and the hinge rotation shaft 42 may be mounted to the mounting bracket 130.

Figure 10:
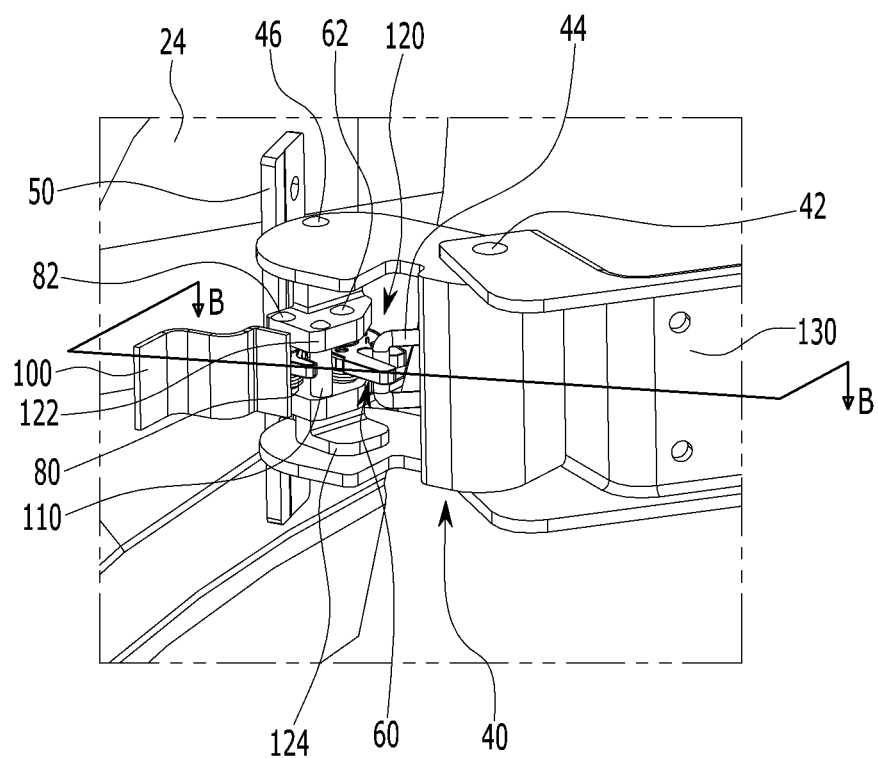
FIG. 10 is a partial perspective view of the door connection structure according to various exemplary embodiments of the present disclosure showing the sliding operation state of the door.
Figure 11:
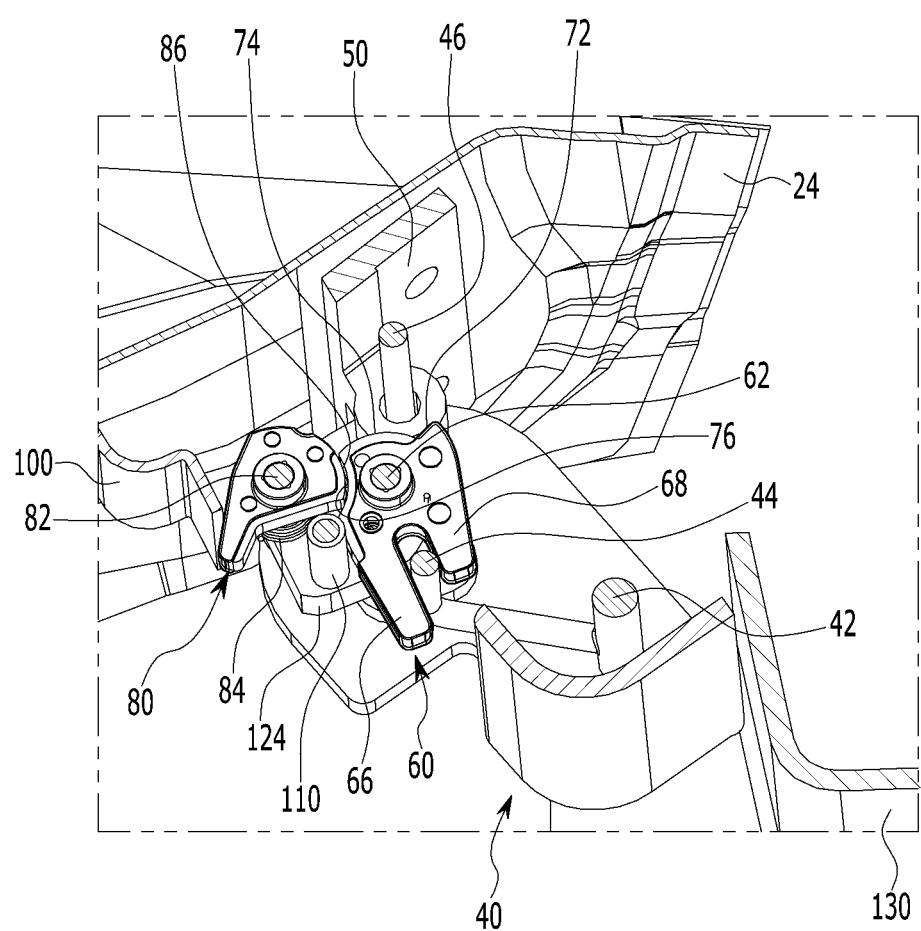
FIG. 11 is a cross-sectional view along the line B-B of FIG. 10.

FIG. 10 is a partial perspective view of the door connection structure according to various exemplary embodiments of the present disclosure showing the sliding operation state of the door, and FIG. 11 is a cross-sectional view along the line B-B of FIG. 10.

Figure 12:
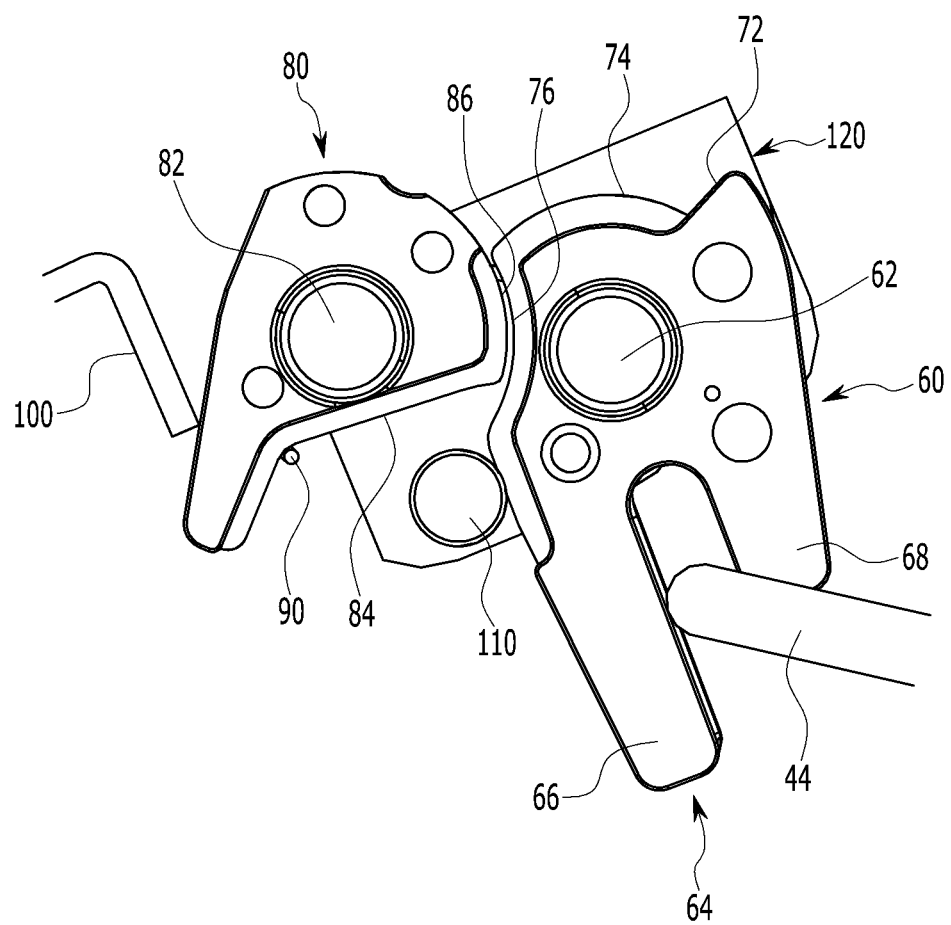
FIG. 12 is a top plan view of the first catcher and the second catcher of the door connection structure according to various exemplary embodiments of the present disclosure showing the door sliding operation state.

FIG. 12 is a top plan view of the first catcher and the second catcher of the door connection structure according to various exemplary embodiments of the present disclosure showing the door sliding operation state.

Figure 13:
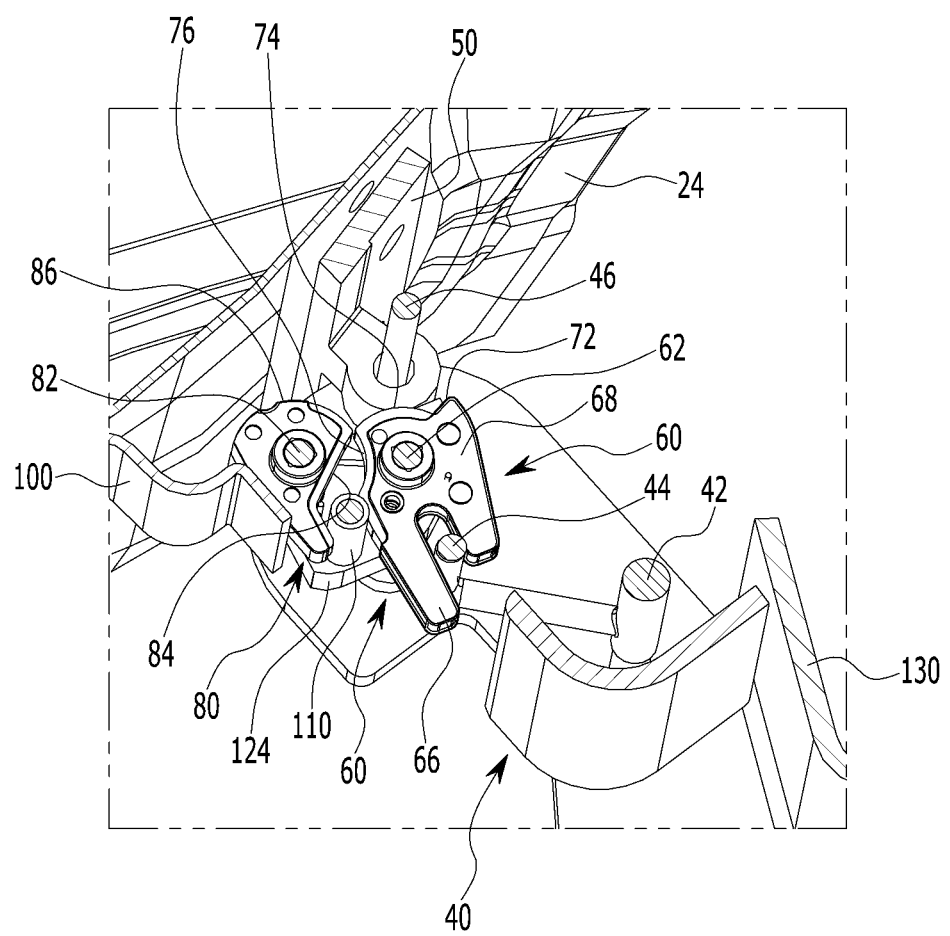
FIG. 13 is a partial cross-section perspective view showing the transition process from the sliding operation state to the swing operation state of the door.
Figure 14:
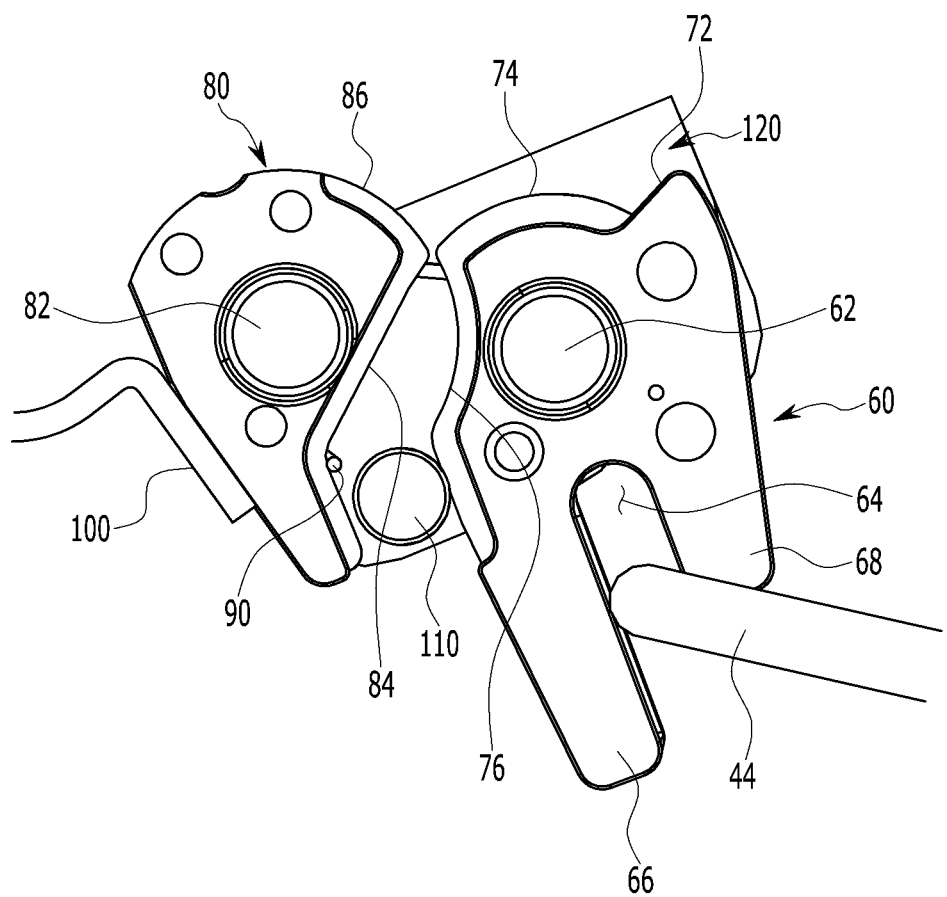
FIG. 14 is a top plan view of the first catcher and the second catcher in the transition process from the sliding operation state to the swing operation state of the door.

FIG. 13 is a partial cross-section perspective view showing the transition process from the sliding operation state to the swing operation state of the door, and FIG. 14 is a top plan view of the first catcher and the second catcher in the transition process from the sliding operation state to the swing operation state of the door.

Figure 15:
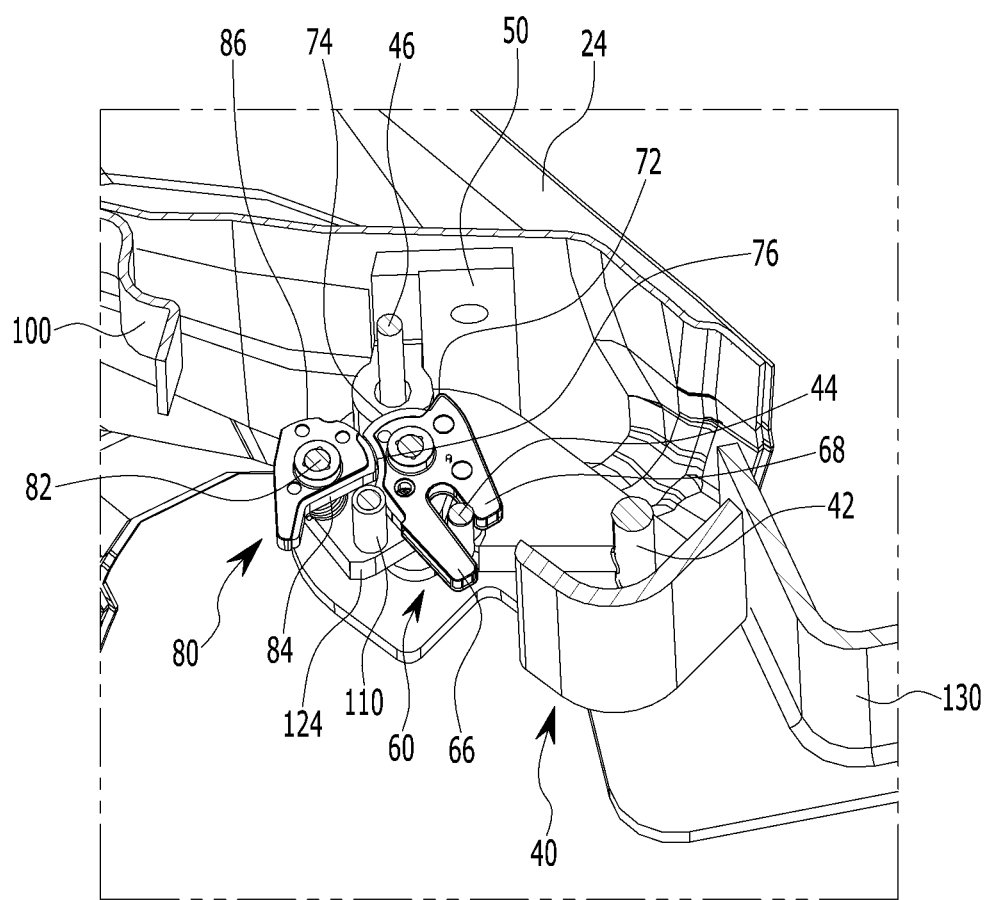
FIG. 15 is a partial cross-sectional view of the door connection structure according to various exemplary embodiments of the present disclosure in which the door shows an open state.

FIG. 15 is a partial cross-sectional view of the door connection structure according to various exemplary embodiments of the present disclosure in which the door shows an open state.

Hereinafter, referring to FIG. 1 to FIG. 15, the operation of the door connection structure according to various exemplary embodiments of the present disclosure will be described.

Referring to FIG. 1, FIG. 5, FIG. 7, FIG. 8 and FIG. 9, when the rear door 24 is closed, the guide striker 32 is inserted inside the strike guide portion 36.

The center striker 44 is positioned at the external position of the center striker guide 64, and the door bracket 100 is separated from the second catcher 80.

The catching protrusion 72 is in contact with the support surface 86 so that the first catcher 60 and the second catcher 80 remain fixed.

That is, based on FIG. 9, the first catcher 60 is receiving an anticlockwise direction power by the first catcher spring 70, and the second catcher 80 is receiving a clockwise direction power by the second catcher spring 90.

In the present state, when the vehicle occupant pulls the handle of the rear door 24, the door latch is released so that the rear door 24 becomes slidable, and when the vehicle occupant pushes or pulls the rear door 24, the rear door 24 is sliding toward the rear of the vehicle body 10.

If the rear door 24 is an auto door, the door may slide rearward by a door button or remote control signal.

FIG. 2, FIG. 6, FIG. 10, FIG. 11 and FIG. 12 show the rear door 24 during sliding operation.

In FIG. 6, when the rear door 24 moves relative to the right side of drawing, the guide striker 32 is positioned outside the strike guide portion 36, that is, at a relative position on the left side of drawing.

Based on FIG. 10, FIG. 11 and FIG. 12, the rear door 24 slides, and the door hinge arm 40 rotates clockwise around the hinge rotation shaft 42.

The center striker 44 is fixed, and as the door hinge arm 40 rotates, the first catcher 60 mounted on the door hinge arm 40 also rotates clockwise with respect to the first catcher rotation shaft 62.

That is, the center striker 44 pushes the first leg 66 within the center striker guide 64.

At the present time, because the guide surface 74 of the first catcher 60 is a curved surface protruded outwardly, the sliding side 84 of the second catcher 80 is pushed and the first catcher 60 may rotate.

And, according to the sliding of the rear door 24, the door bracket 100 moves to push the second catcher 80, and according to this, the fixing surface 76 and the support surface 86 are separated.

FIG. 3, FIG. 13 and FIG. 14 shows the transition process from the sliding operation state of the door connection structure to the swing operation state according to various exemplary embodiments of the present disclosure.

When the first catcher 60 is rotated by the center striker 44 and supported by the stopper 110, the first catcher 60 is fixed and rotation of the door hinge arm 40 is also stopped.

Accordingly, the rear door 24 rotates around the door rotation shaft 46, that is, swing operation starts.

According to the swing operation of the rear door 24, the door bracket 100 pushes the second catcher 80, and the second catcher 80 rotates anticlockwise based on FIG. 13 and FIG. 14.

At the present time, the guide striker 32 is completely separated from the strike guide portion 36.

FIG. 4 and FIG. 15 show a completely open state of the door of the door connection structure according to various exemplary embodiments of the present disclosure.

According to the swing operation of the rear door 24, the door bracket 100 is separated from the second catcher 80, and the second catcher 80 is rotated clockwise in drawing by elastic force of the second catcher spring 90.

Accordingly, the support surface 86 pushes the fixing surface 76, the first catcher 60 and the second catcher 80 are fixed, the door hinge arm 40 also remains fixed, and the rear door 24 may be rotated around the door rotation shaft 46 for swing operation.

Accordingly, the rear door 24 is shown in FIG. 4 and as shown in FIG. 15, may be fully opened.

Conversely, when the vehicle occupant or the like closes the rear door 24, the first catcher 60 and the second catcher 80 are in a fixed state, and the rear door 24 rotates with respect to the door rotation shaft 46 in the opposite direction, that is, based on FIG. 4, the count operation is performed anticlockwise.

After that, as shown in FIG. 14, the door bracket 100 pushes the second catcher 80 and rotates it anticlockwise.

And, according to the reverse order of the operation described above, that is, the swing operation is converted to the sliding operation, and the rear door 24 is closed.

At the present time, the guide striker 32 is inserted into the strike guide portion 36 and guides the sliding operation of the rear door 24.

Because the closing process of the door is in the reverse order of the door opening process described above, a repeated description will be omitted.

As described above, according to the door connection structure according to various exemplary embodiments of the present disclosure, the door may be opened or closed by a double motion of sliding and swing motion.

According to the door connection structure according to various exemplary embodiments of the present disclosure, the front and rear doors may be opened independently regardless of the presence or absence of pillars, that is, regardless of the order.

According to the door connection structure according to various exemplary embodiments of the present disclosure, it is possible to drive without a separate electrical operation configuration for selectively fixing the rotation shaft during swing operation and sliding operation.

Therefore, it is possible to open or close the door despite the discharge of the battery.

Furthermore, according to the door connection structure according to various exemplary embodiments of the present disclosure, it may be applied to an opposing door or an opposing swing door.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door connection structure comprising:
   a door guide for guiding a door in a longitudinal direction of a vehicle body;
   a door hinge arm mounted on the vehicle body, and including a hinge rotation shaft and a door rotation shaft, wherein the door hinge arm rotates around the hinge rotation shaft when the door is sliding;
   a door hinge rotatably mounted around the door rotation shaft and connected to the door;
   a first catcher rotatably mounted on the door hinge arm and of which a center striker guide is formed thereto; and
   a center striker which is inserted into the center striker guide to rotate the first catcher and limits rotation of the first catcher when the door swings so that the door swings around the door rotation shaft.

2. The door connection structure of claim 1, further including a first catcher spring for elasticity supporting the first catcher in a direction opposite to a swing direction of the door when the door is opened.

3. The door connection structure of claim 1, further including a second catcher rotatably mounted on the door hinge arm to maintain a fixed state of the first catcher when the door swings.

4. The door connection structure of claim 3, further including a second catcher spring that elastically supports the second catcher in a swing direction of the door when the door is opened.

5. The door connection structure of claim 3, further including a door bracket mounted on the door for the first catcher to be rotatable by selectively pressing the second catcher when sliding motion and swing motion of the door are switched.

6. The door connection structure of claim 1, further including a stopper mounted on the door hinge arm to limit rotation of the first catcher.

7. The door connection structure of claim 3, wherein the first catcher includes:
   a catching protrusion that contacts with the second catcher and rotation of the first catcher is constrained by the catching protrusion when the door is closed;
   a guide surface contacting with the second catcher when the door is closed; and
   a fixing surface contacting with the second catcher when the door swings.

8. The door connection structure of claim 7,
   wherein the guide surface is a curved surface protruded outwardly, and
   wherein the fixing surface is a curved surface formed concave inwardly.

9. The door connection structure of claim 7, wherein the second catcher includes:
   a sliding side in selective contact with the guide surface; and
   a support surface in selective contact with the catching protrusion or the fixing surface.

10. The door connection structure of claim 9, wherein the support surface is a curved surface protruded outwardly corresponding to a shape of the fixing surface.

11. The door connection structure of claim 3, further including a door hinge arm bracket mounted on the door hinge arm, wherein the first catcher and the second catcher are rotatably mounted on the door hinge arm bracket.

12. The door connection structure of claim 11, wherein the door hinge arm bracket includes:
   an internal flange to which the first catcher and the second catcher are mounted; and
   an external flange engaging the door hinge arm.

13. The door connection structure of claim 1, wherein the center striker is fixed to the hinge rotation shaft.

14. The door connection structure of claim 1, wherein the center striker guide of the first catcher includes:
   a first leg contacting with the center striker; and
   a second leg formed shorter than the first leg to selectively contact with the center striker.

15. The door connection structure of claim 1, wherein the door guide includes:
   a guide striker mounted on the vehicle body; and
   a guide body mounted on the door, wherein a strike guide portion into which the guide striker is inserted is formed in the guide body.

16. The door connection structure of claim 1, further including a mounting bracket coupled to the vehicle body, wherein the hinge rotation shaft is mounted to the mounting bracket.

17. The door connection structure of claim 1, wherein the door is an opposing door or an opposing swing door.

18. The door connection structure of claim 1, wherein the door is a rear door.

* * * * *